(12) United States Patent
Kuroda

(10) Patent No.: US 7,014,321 B2
(45) Date of Patent: Mar. 21, 2006

(54) ILLUMINATION DEVICE, PROJECTOR

(75) Inventor: Akitoshi Kuroda, Yamagata-Mura (JP)

(73) Assignee: Seiko Epson Corporation, Tokyo (JP)

( * ) Notice: Subject to any disclaimer, the term of this patent is extended or adjusted under 35 U.S.C. 154(b) by 98 days.

(21) Appl. No.: 10/687,822

(22) Filed: Oct. 20, 2003

(65) Prior Publication Data
US 2005/0030484 A1 Feb. 10, 2005

(30) Foreign Application Priority Data
Oct. 18, 2002 (JP) ............................ 2002-304758
Oct. 18, 2002 (JP) ............................ 2002-304843

(51) Int. Cl.
*G03B 21/16* (2006.01)
*G03B 21/18* (2006.01)
(52) U.S. Cl. ............................. 353/61; 353/58; 353/60
(58) Field of Classification Search ................. 353/61, 353/30, 31, 34, 37, 52, 56–58, 60, 119, 122
See application file for complete search history.

(56) References Cited

U.S. PATENT DOCUMENTS 3,117,489 A * 1/1964 Wilton ........................ 353/60
5,951,136 A * 9/1999 Furuhata et al. ............... 353/31

FOREIGN PATENT DOCUMENTS

| JP | A 08-304739 | 11/1996 |
| JP | A 2000-010191 | 1/2000 |
| JP | A 2000-330202 | 11/2000 |

* cited by examiner

Primary Examiner—Judy Nguyen
Assistant Examiner—Rochelle Blackman
(74) Attorney, Agent, or Firm—Oliff & Berridge, PLC

(57) ABSTRACT

The invention provides a projector that can have a light source device, an optical device that modulates, in accordance with image information, beams emitted from the light source device to form an optical image, and an external case that accommodates the light source device and the optical device. The projector can enlarge and project the optical image formed by the optical device. The projector can include leg portions that are disposed so as to be extendable from and retractable to an outer peripheral surface of the external case to adjust the projection position of the enlarged and projected optical image, an intake opening formed in the surface of the external case disposed with the leg portions, and an intake fan that is disposed inside the external case near the intake opening and introduces cooling air from the outside of the external case. An intake surface of the intake fan can be disposed at an inclination with respect to the plane of the external case in which the intake opening is formed.

11 Claims, 12 Drawing Sheets

ILLUMINATION DEVICE, PROJECTOR

BACKGROUND OF THE INVENTION

1. Field of Invention

The present invention relates to a projector including a light source, light modulating devices that modulate, in accordance with image information, beams emitted from the light source to form an optical image, and a case that accommodates the light source and the light modulating devices, and the projector enlarges and projects the optical image formed by the light modulating devices.

2. Description of Related Art

Conventionally, projectors that modulate, in accordance with image information, beams emitted from a light source and enlarge and project the beam have been used. In recent years, such projectors are being used for various purposes, such as business presentations with personal computers and watching movies at home.

Such projectors are disposed with an optical device for forming an optical image, a light source, and a power supply circuit and a lamp drive circuit for supplying power to optical device and the light source, and these are accommodated inside a case.

Here, the light source, the power supply circuit and the lamp drive circuit are heat-generating sources that generate heat inside the case during operation, and there are parts among the light modulating devices and optical parts configuring the optical device that are sensitive to heat. Thus, a cooling system that introduces cooling air from outside of the case to cool respective parts within the case is disposed in the projector.

As described in JP-A-2000-330202 (FIGS. 5 and 8) and JP-A-2000-10191 (FIG. 1), cooling systems are classified into cooling systems of optical systems including an optical device, light source cooling systems, and power supply and light source drive circuit cooling systems. Conventionally, a configuration has been used where, for example, air passing through the cooling system of the optical system is supplied to the power supply and light source drive circuit cooling system to cool these circuits, and finally the air is discharged to the outside of the case from a discharge fan disposed near the light source (e.g., see Patent Document 1 and Patent Document 2).

SUMMARY OF THE INVENTION

However, because the configuration of this conventional cooling system uses as cooling air for the circuits, air that has already cooled the optical system, the power supply circuit, the light source drive circuit or the like cannot be cooled with high efficiency, and there is a demand for a method that can more efficiently cool the power supply circuit and the light source drive circuit.

Although it is conceivable to independently dispose flow paths to cool these circuits, it is necessary to form a cooling flow path from the front surface of the case to the rear surface, dispose an intake fan at the front surface of the case and dispose a discharge fan at the rear surface side of the device in order to efficiently cool the interior of the case. Thus, the intake fan to cool the circuits and the fan disposed in the cooling flow path of other constituent members end up interfering with each other and the miniaturization of the projector cannot be promoted.

It is an object of the present invention to provide a projector that can efficiently cool constituent members inside a case including the power supply circuit, the light source drive circuit or the like and that can promote miniaturization.

The projector of the invention includes a light source, light modulating devices that modulate in accordance with image information beams emitted from the light source to form an optical image, and a case that accommodates the light source and the light modulating devices, and the projector enlarges and projects the optical image formed by the light modulating devices, the projector including: leg portions that are disposed so as to be extendable from and retractable to an outer peripheral surface of the case to adjust the projection position of the enlarged and projected optical image, an intake opening formed in the surface of the case disposed with the leg portions, and an intake fan that is disposed inside the case near the intake opening and introduces cooling air from the outside of the case, wherein an intake surface of the intake fan is disposed at an inclination with respect to the plane of the case in which the intake opening is formed.

Here, various fans such as an axial fan or a sirocco fan can be used as the intake fan, but it is preferable to dispose an intake fan with an orientation where the intake surface of the intake fan is disposed facing the intake opening.

According to this invention, the intake opening is formed in the surface of the case disposed with the leg portions and outside air is directly introduced through the intake opening by the intake fan. Thus, the cooling air flow does not interfere with other cooling air flows taken in by other fans inside the case, it becomes possible for the respective fans to take in cooling respective airs and blow a sufficient amount of the cooling air to cooling targets. Additionally, turbulence resulting from the interference of the respective fans can be prevented and the prevention of noise can also be achieved. Moreover, by disposing the intake opening in the surface of the case disposed with the leg portions and disposing the intake fan near the intake opening, it is easy to miniaturize the projector in plan view.

Also, the intake surface of the intake fan is disposed at an inclination with respect to the plane of the case in which the intake opening is formed. Thus, when the projector is set on a mounting table or the like, the intake surface of the intake fan is disposed at a predetermined distance away from the surface of the mounting table even if the intake opening and the surface of the mounting table are close, and it becomes possible to secure a space near the intake surface 63A of the intake fan 63. Thus, the intake fan can reliably introduce sufficient cooling air to the interior of the case, can prevent turbulence in the vicinity of the intake fan 63 and can prevent noise. In other words, even in a state where the intake surface of the intake fan is close to the surface of the mounting table, instances where the case blocks the flow of air caused by the rotation of the intake fan so that the intake amount is lessened and frictional noise is generated can be prevented.

Moreover, by disposing the intake fan at an inclination with respect to the plane of the case, the intake fan is disposed away from the intake opening formed in the case, whereby it becomes difficult for noise caused by the rotation of the intake fan to leak to the outside of the case and the quietness of the projector is improved.

In the invention, in a case where the projector described above includes a power supply circuit that supplies power to the light source and the light modulating devices and a light source drive circuit for driving the light source, the intake fan is preferably used in a cooling flow path that cools the power supply circuit and the light source drive circuit.

According to this invention, cooling air can be directly introduced from the outside of the case to cool the power supply circuit and the light source drive circuit, which are heat-generating sources. Thus, these circuits can be efficiently cooled.

In the invention, the cooling flow path of cooling air introduced by the intake fan is preferably set independent from another cooling flow path.

According to this invention, by making the cooling system of the power supply circuit and the light source drive circuit independent from other cooling systems, these circuits can be even more efficiently cooled, and the cooling efficiency of other cooling systems can also be improved without heat generated by these circuits exerting an influence on the other cooling systems.

In the invention, the cooling flow path described above is preferably configured to allow the cooling air to circulate along the surface of the case in which the intake opening is formed.

According to this invention, the cooling flow path of the power supply circuit and the light source drive circuit can be reliably made independent from other cooling flow paths.

In the invention, the cooling flow path of the power supply circuit and the light source drive circuit described above is preferably partitioned by tabular bodies disposed vertically from an inner surface of the case.

Here, the tabular bodies are preferably disposed on the inner surface of the case so as to be integral with the case. In an instance where the case is made of resin, the tabular bodies can be integrally disposed by, for example, injection molding or the like.

According to the invention, the cooling flow path is partitioned by the tabular bodies, whereby the cooling flow path can be made completely independent from other cooling flow paths. Thus, the cooling efficiency of the power supply circuit and the light source drive circuit can be cooled even more efficiently.

In the invention, in an instance where the power supply circuit and the light source drive circuit are surrounded by cylindrical air-guiding bodies respectively, the cooling air from the intake fan is preferably supplied to the inside of each air-guiding body.

Here, various materials that can surround these circuit boards can be used for the air-guiding bodies, but the air-guiding body is preferably configured with metal so that its ability to dissipate heat is improved and an electromagnetic shield function of a circuit board is imparted to the air-guiding bodies.

Also, by adjusting the angle of inclination of the discharge surface of the intake fan with respect to the open end of the cylindrical air-guiding bodies and/or the shape of the opening of the intake side of each air-guiding body and/or the shape of the opening of the discharge side of each air-guiding body, it is possible to change the amount of cooling air introduced to each air-guiding body.

According to the invention, by adjusting the angle of inclination of the discharge surface of the intake fan and/or the shape of the opening of the intake side of each air-guiding body and/or the shape of the opening of the discharge side of each air-guiding body in accordance with the heat-generating state of the power supply circuit and the light source drive circuit, the cooling air can be proportionally divided and introduced to each air-guiding body. Thus, the cooling efficiency of these circuit boards can be further improved.

Also, by configuring the air-guiding bodies with metal, a function as an electromagnetic shield can be imparted in addition to improving the ability to dissipate heat. Thus, it is not necessary to separately provide an EMI-prevention with respect to the power supply circuit and the light source drive circuit, and the internal structure of the projector can be simplified.

In the invention, the intake fan is preferably attached to the air-guiding bodies described above.

According to this invention, when the intake surface of the intake fan is disposed at an inclination with respect to the plane of the case, it becomes unnecessary to separately dispose a support member for the intake fan on the inside of the case. Thus, the internal structure of the projector can be further simplified and the device can be made compact, which is preferable.

In the invention, preferably, the intake opening is a first intake opening, the intake fan is a first intake fan, a discharge opening through which air inside the case is discharged to the outside of the case is disposed in a side surface of the case, and the projector further includes a second intake opening disposed in the case separately from the first intake opening, a second intake fan that is disposed near the second intake opening and introduces cooling air from the outside of the case, a first cooling system that uses the second intake fan to introduce, through the second intake opening to the inside of the case, air from the outside of the case, circulates the air to the discharge opening so that the air is discharged through the discharge opening to the outside of the case, to thereby cool the light modulating devices and the light source, and a second cooling system that uses the first intake fan to introduce, through the first intake opening to the inside of the case, air from the outside of the case, circulates the air to the discharge opening so that the air is discharged through the discharge opening to the outside of the case, to thereby cool the power supply circuit and the light source drive circuit.

According to this invention, due to the respectively independent air flows, the molding of the case can be simplified and it is easy to manage the discharge direction of the air because the first cooling air flow and the second cooling air flow that have efficiently cooled respective heat-generating sources inside the projector can be discharged through the single discharge opening.

In the invention, the first cooling air flow and the second cooling air flow are preferably discharged from the different regions in the discharge opening.

According to this invention, discharge of the first cooling air flow and the second air flow can be conducted through different regions in the discharge opening. Thus, the first cooling air flow and the second cooling air flow can be discharged without mutual interference even at the time of discharge, so that the interior of the projector can be cooled efficiently.

In the invention, preferably, the power supply circuit is disposed inside a cylindrical first air-guiding body, the light source drive circuit is disposed inside a cylindrical second air-guiding body, one part of the second cooling air flow is introduced to the inside of the first air-guiding body and another part of the second cooling air flow is introduced to the inside of the second air-guiding body, and the air flow circulating through the first air-guiding body and the air flow circulating through the second air-guiding body are discharged through different regions in the discharge opening.

According to this invention, the power supply circuit and the light source drive circuit can be cooled with respectively independent cooling air flows and the discharge of air cooling these can be conducted through different regions in the discharge opening. Thus, the respective cooling air flows can more efficiently cool the power supply circuit and the light source drive circuit without interfering with each other.

In the invention, an intake surface of the first intake fan is preferably disposed at an inclination so as to become closer to the first intake opening as it approaches the discharge opening.

According to this invention, the intake surface of the first intake fan is disposed in the direction opposing to the air flow that has already cooled other heat sources inside the projector and become warm. Thus, the first intake fan can be prevented from taking in the warm air inside the projector, and the intake fan can take in a larger amount of low-temperature air from outside the projector.

DETAILED DESCRIPTION OF PREFERRED EMBODIMENTS

An embodiment of the invention will be described below on the basis of the drawings.

(1) External Configuration

Figure 1:
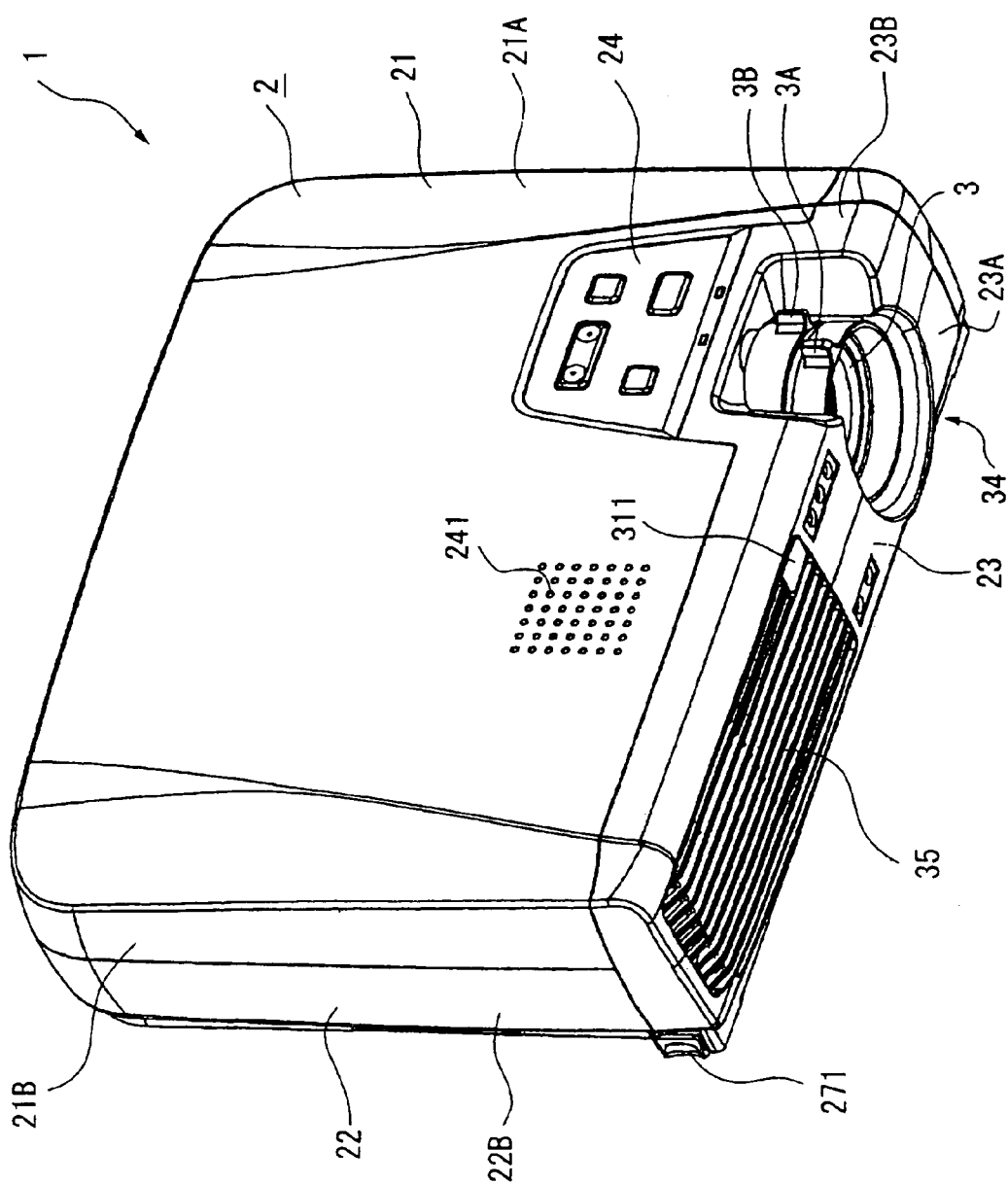
FIG. 1 is a schematic perspective view showing the external configuration of a projector according to an embodiment of the invention.
Figure 2:
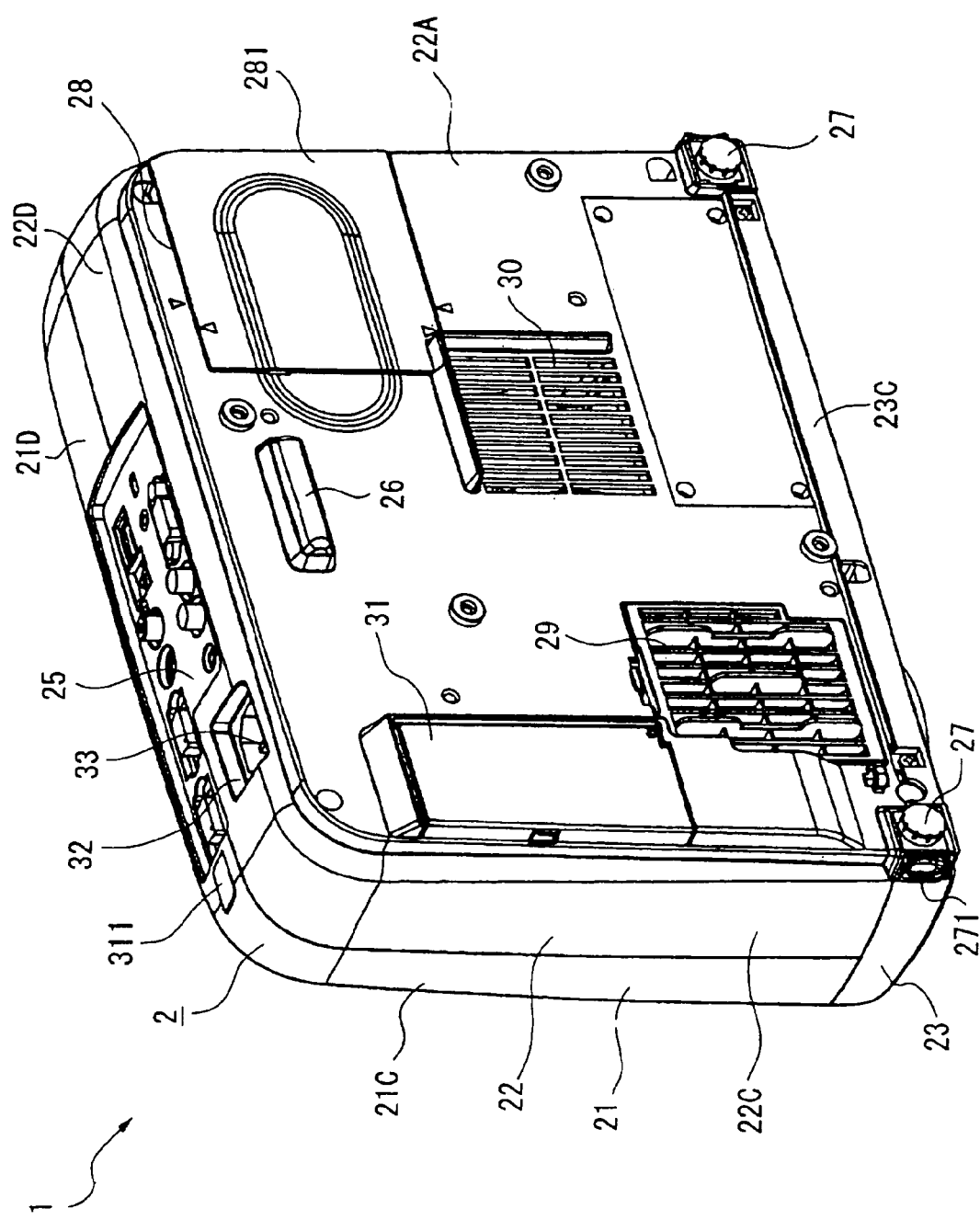
FIG. 2 is a schematic perspective view showing the external configuration of the projector in the embodiment.

A projector 1 according to the embodiment of the invention is shown in FIGS. 1 and 2. FIG. 1 is a perspective view seen from an upper front side, and FIG. 2 is a perspective view seen from a lower rear side.

The projector 1 is an optical apparatus that modulates, in accordance with image information, beams emitted from a light source and enlarges and projects the beams onto a projection surface such as a screen. The projector 1 has an external case 2 that accommodates thereinside a device body including an optical device described later and a projection lens 3 that is exposed through the external case 2.

The projection lens 3 has the function of a projection optical system that enlarges and projects an optical image formed by light modulating devices modulating, in accordance with image information, beams emitted from a light source described later and light synthesizer synthesizing the modulated beams. The projection lens 3 is configured as a group lens where a plurality of lenses is accommodated inside a lens barrel.

The external case 2 serving as a case has a broad rectangular shape whose dimension in the width direction, which orthogonally the projection direction, is larger than its dimension in the projection direction. The external case 2 has an upper case 21 that covers an upper portion of the device body, a lower case 22 that covers a lower portion of the device body, and a front case 23 that covers a front portion of the device body. Each of these cases 21 to 23 is an integrally molded part made of synthetic resin formed by injection molding or the like.

The upper case 21 is disposed with an upper surface portion 21A that covers the upper portion of the device body, side surface portions 21B and 21C that substantially drop down from width-direction end portions of the upper surface portion 21A, and a rear surface portion 21D that substantially drops down from a rear end portion of the upper surface portion 21A.

An operational panel 24 for starting/adjusting the projector 1 is disposed at the projection-direction front side of the upper surface portion 21A. The operational panel 24 is disposed with a plurality of switches including a start switch and an adjustment switch for image/audio or the like. By operating the adjustment switches or the like on the operational panel 24 at the time of projection by the projector 1, adjustment of image quality/volume or the like can be conducted.

Also, a plurality of holes 241 is formed next to the operational panel 24 of the upper surface portion 21A. Although it is not shown, a speaker for audio output is accommodated thereinside.

The operational panel 24 and the speaker are electrically connected to a later-described control board configuring the device body. Operational signals from the operational panel 24 are processed by the control board.

A recessed portion that is cut out at the upper surface portion 21A side is formed in a substantially center portion of the rear surface portion 21D. A connector group 25 disposed on a later-described interface board connected to the control board is exposed in the recessed portion.

The lower case 22 is configured so as to be substantially symmetrical around surfaces that engage with the upper case 21, and is disposed with a bottom surface portion 22A, side surface portions 22B and 22C, and a rear surface portion 22D. The side surface portions 22B and 22C and the rear surface portion 22D engage, at upper end portions thereof, with lower end portions of the side surface portions 21B and 21C and the rear surface portion 21D of the upper case 21 to configure the side surface portions and the rear surface portion of the external case 2.

At the bottom surface portion 22A, a fixed leg portion 26 is disposed in a substantial center of the rear end side of the projector 1 and adjustable leg portions 27 are disposed at both width-direction ends at the front end side.

The adjustable leg portions 27 are configured by rod-like members that project outward, so as to be extendable and retractable, from the bottom surface portion 22A, and the rod-like members themselves are accommodated inside the external case 2. By operating an adjustment button 271 disposed in a side surface portion of the projector 1, the amount that the adjustable leg portions 27 extend from and retract to the bottom surface portion 22A can be adjusted.

Thus, it becomes possible to adjust the vertical position of the projection image emitted from the projector 1 and form the projection image at an appropriate position.

Openings 28, 29 and 30, which communicate with the inside of the external case 2, are formed in the bottom surface portion 22A.

The opening 28 is a portion to which a light source device 411 including the light source of the projector 1 attaches and detaches through, and is ordinarily closed off by a lamp cover 281.

The openings 29 and 30 are configured as slit-like openings.

The opening 29 is an intake opening for taking in cooling air for cooling an optical device 44 including liquid crystal panels serving as light modulating devices that modulate, in accordance with image information, the beams emitted from a light source lamp.

The opening 30 is an intake opening for taking in cooling air for cooling a power supply device configuring the device body of the projector 1.

Because the openings 29 and 30 always communicate with the inside of the projector 1 at the slit-like open portions thereof, dust-prevention filters are disposed at inner sides thereof so that dust or the like does not enter the inside.

Moreover, a cover member 31 that is attached so as to be slidable outward with respect to the bottom surface portion 22A is disposed at the bottom surface portion 22A. A remote controller for remotely controlling the projector 1 is accommodated inside the cover member 31. Switches that are the same as the starting switch, the adjustment switches or the like disposed on the operational panel 24 described above are disposed on the unillustrated remote controller. When the remote controller is operated, an infrared signal corresponding to that operation is outputted from the remote controller and the infrared signal is processed by the control board via light-receiving portions 311 disposed on the front surface and the rear surface of the external case.

Similar to the instance of the upper case 21, a recessed portion cut out at the bottom surface portion 22A side is formed in a substantially central portion of the rear surface portion 22D. The connector group 25 disposed on the interface board is exposed, an opening 32 is formed near an end portion, and an inlet connector 33 is exposed through the opening 32. The inlet connector 33 is a terminal that supplies power to the projector 1 from an external power source and is electrically connected to a power supply unit described later.

The front case 23 is configured by a front surface portion 23A, an upper surface portion 23B and a lower surface portion 23C and engages with the projection-direction front end portion of the upper case 21 described above at the projection-direction rear end side of the upper surface portion 23B and the projection-direction front end portion of the lower case 22 described above at the projection-direction rear end side of the lower surface portion 23C.

A substantially circular opening 34 for exposing the projection lens 3 and an opening 35 configured by a plurality of slits formed next to the opening 34 are formed in the front surface portion 23A.

An upper surface side of the opening 34 is further open so that part of the lens barrel of the projection lens 3 is exposed and so that knobs 3A and 3B, which are disposed around the lens barrel and are for adjusting the zooming and focusing of the projection lens 3, can be operated from the outside.

The opening 35 is configured as a discharge opening through which air that has cooled the device body is discharged. The air that has cooled the optical system, the control system and the power supply device, which are later-described constituent members of the projector 1, is discharged in the projection direction of the projector 1 through the opening 35.

(2) Internal Configuration

Figure 3:
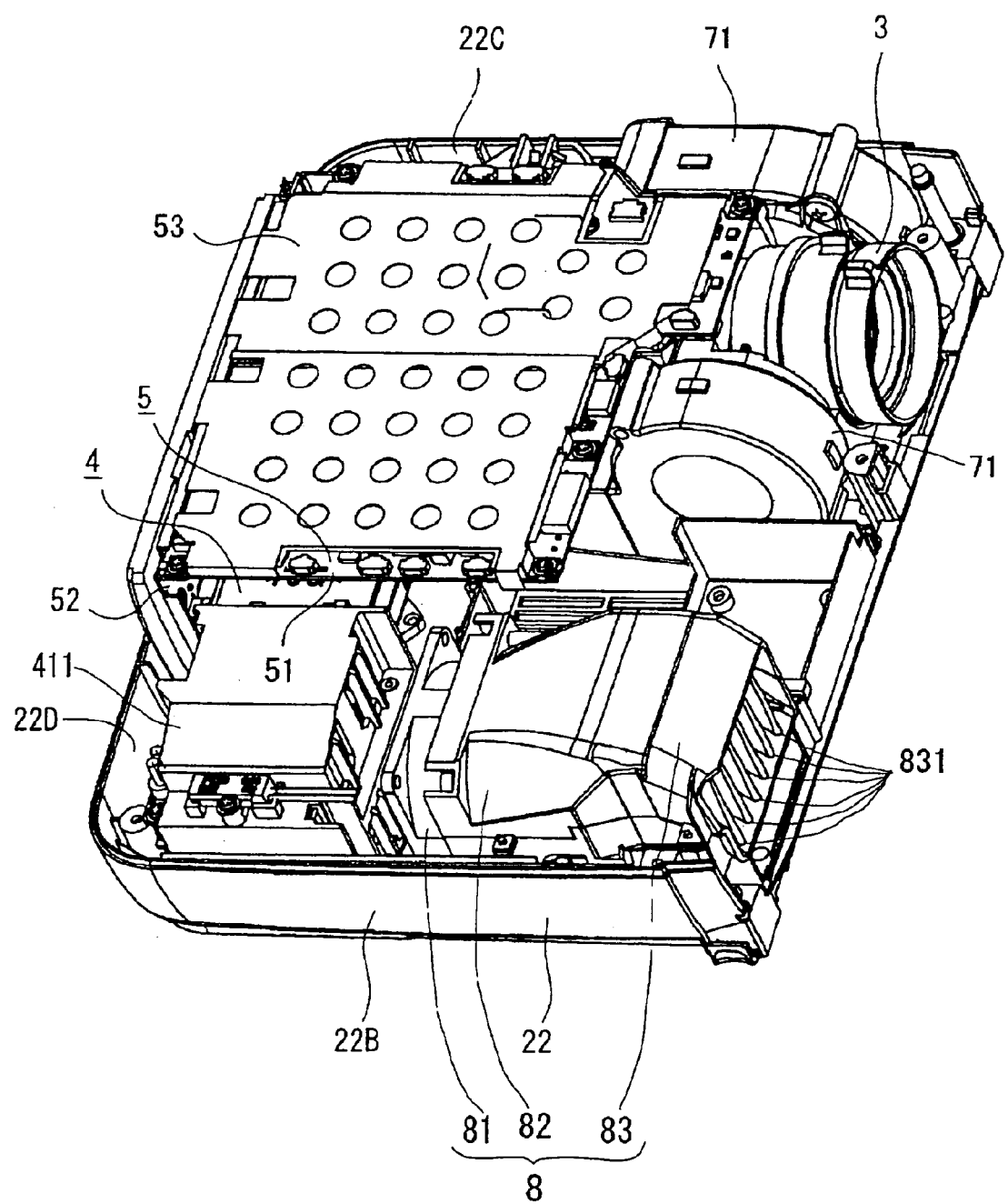
FIG. 3 is a schematic perspective view showing the internal configuration of the projector in the embodiment.
Figure 4:
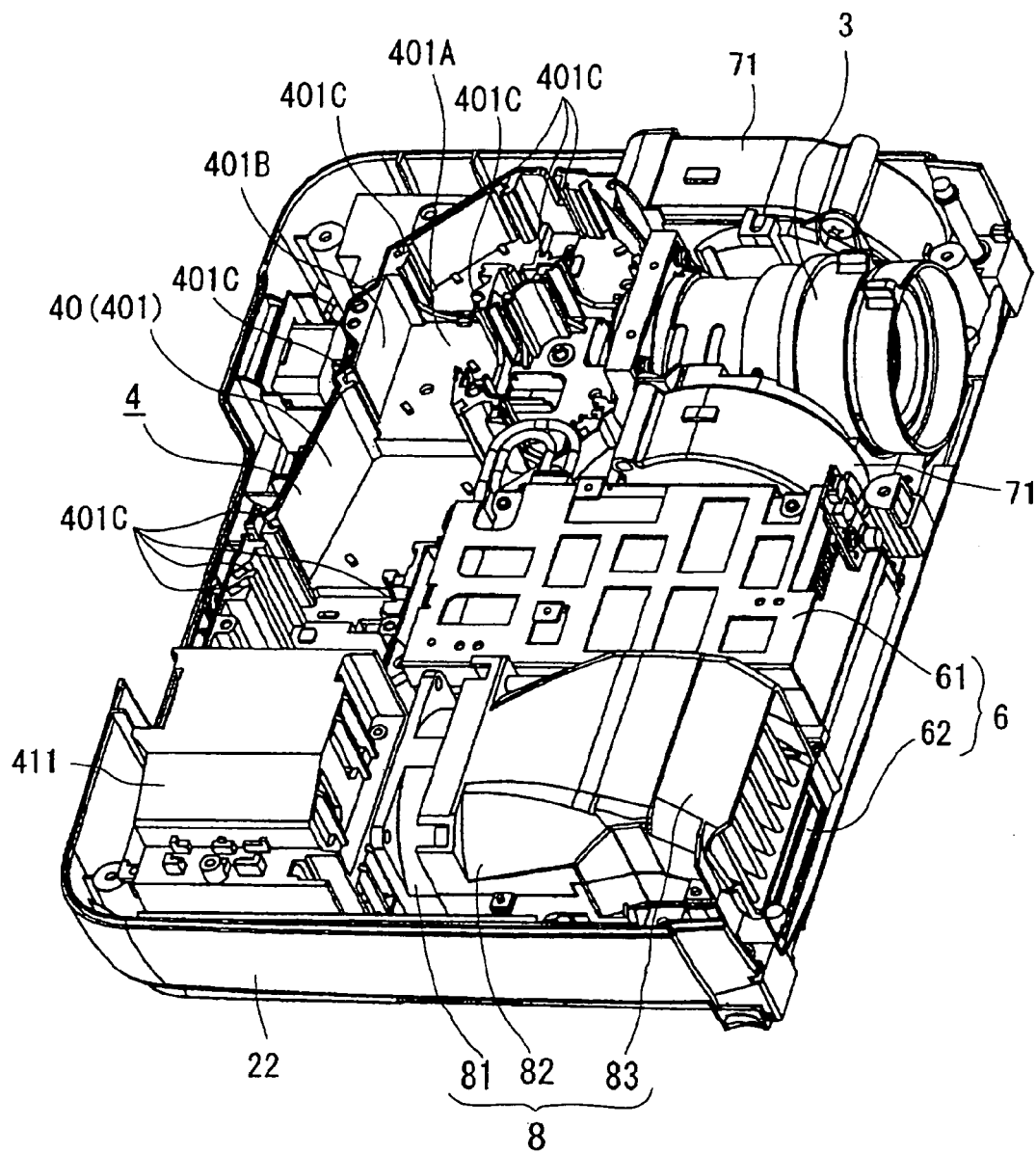
FIG. 4 is a schematic perspective view showing the internal configuration of the projector in the embodiment.
Figure 5:
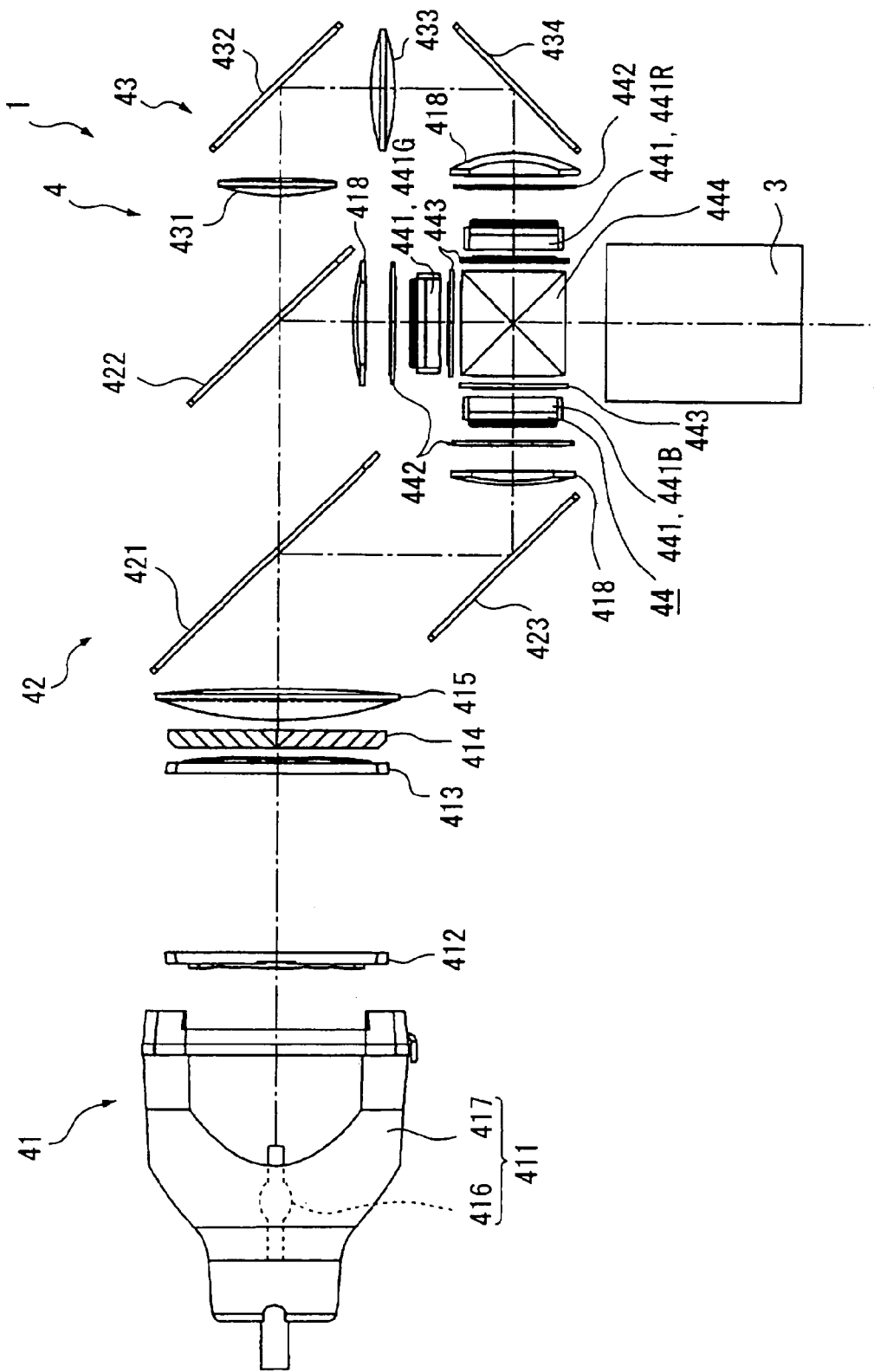
FIG. 5 is a schematic view showing the configuration of an optical system of the projector in the embodiment.

As shown in FIGS. 3 to 5, the device body of the projector 1 is accommodated inside the external case 2. The device body is configured by an optical unit 4 and a control board 5 shown in FIG. 3 and a power supply device 6 shown in FIG. 4.

(2-1) Structure of Optical Unit 4

The optical unit 4 forms an optical image by modulating, in accordance with image information, the beams emitted from the light source device 411 and forms a projection image on a screen via the projection lens 3. The optical unit 4 is configured as a unit where the light source device 411 and various optical parts or the like are incorporated inside an optical parts casing called a light guide 40 that is shown in FIG. 4.

The light guide 40 is configured by a lower light guide 401 and an upper light guide that is not shown in FIG. 4. Each is a part made of synthetic resin resulting from injection molding or the like.

The lower light guide 401 is formed in a container shape whose upper portion is open and which comprises a bottom surface portion 401A and a side wall portion 401B that accommodate optical parts. A plurality of groove portions 401C is disposed in the side wall portion 401B. Various optical parts configuring the optical unit 4 are mounted in the groove portions 401C, whereby the optical parts are precisely disposed on an illumination light axis set inside the light guide 40. The upper light guide has a planar shape corresponding to the lower light guide 401 and is configured as a cover-like member that closes off an upper surface of the lower light guide 401.

A front surface wall, in which a circular opening is formed, is disposed at a beam emission side end portion of the bottom surface portion 401A of the lower light guide 401, and a base end portion of the projection lens 3 joins with and is fixed at the front surface wall.

As shown in FIG. 5, the inside of the light guide 40 can be broadly and functionally divided into an integrator illuminating optical system 41, a color separating optical system 42, a relay optical system 43, and the optical device 44 in which a light modulating optical system and a color synthesizing optical system are integrated. The optical unit 4 in the present embodiment is used for a triple-panel type projector and is configured as a space/color separating type optical unit that separates, into color lights of three colors, the beams emitted from the integrator illuminating optical system 41 inside the light guide 40.

The integrator illuminating optical system 41 is an optical system that makes the beams emitted from the light source into beams whose illumination in the plane perpendicular to the illumination light axis is uniform. The integrator illuminating optical system 41 is configured by the light source device 411, a first lens array 412, a second lens array 413, a polarization converting element 414 and an superposition lens 415.

The light source device 411 has a light source lamp 416 serving as an emission light source and a reflector 417. Radial light beams emitted from the light source lamp 416 are reflected by the reflector 417, made into substantially parallel light beams and emitted to the outside. In the present embodiment, a high-pressure mercury lamp is used as the light source lamp 416, but sometimes a metal halide lamp or a halogen lamp is used instead. Also, in the present embodiment, a parabolic mirror is used as the reflector 417, but a configuration where a collimating concave lens is disposed on the emission surface of a reflector comprising an ellipsoidal mirror can also be used.

The first lens array 412 has a configuration where small lenses having substantially rectangular contours when seen from the illumination light axis direction are arranged in a matrix. The each small lens separates the beams emitted from the light source lamp 416 into partial beams and emits the partial beams in the illumination light axis direction. The contour shape of each small lens is set so as to be of a shape that is substantially similar to the shape of image forming regions of liquid crystal panels 441 described later. For example, if the aspect ratio (ratio of the horizontal and vertical dimensions) of the image forming regions of the liquid crystal panels 441 is 4:3, then the aspect ratio of each small lens is also set to 4:3.

The second lens array 413 has a configuration that is substantially the same as that of the first lens array 412 and in which small lenses are arranged in a matrix. The second lens array 413 includes the function of imaging, on the liquid crystal panels 441, the image of each small lens of the first lens array 412 together with the superposition lens 415.

The polarization converting element 414 changes light from the second lens array 413 into one kind of polarized light, whereby the utilization ratio of light by the optical device 44 is raised.

Specifically, each partial beam changed to the one kind of polarized light by the polarization converting element 414 is finally substantially superposed on the liquid crystal panels 441 of the optical device 44 by the superposition lens 415. Because only polarized light of one kind can be used in a projector using liquid crystal panels 441 of the type that modulates polarized light, substantially half of the beams from the light source lamp 416 emitting random polarized light are not used. For this reason, by using the polarization converting element 414, all of the beams emitted from the light source lamp 416 are changed to one kind of polarized light and the utilization ratio of light in the optical device 44 is raised. Such polarization converting element 414 is introduced in, for example, JP-A-8-304793.

The color separating optical system 42 has two dichroic mirrors 421 and 422 and a reflective mirror 423, and includes the function of using the dichroic mirrors 421 and 422 to separate, into color lights of the three colors of red (R), green (G) and blue (B), the a plurality partial beams emitted from the integrator illuminating optical system 41.

The relay optical system 43 has an incident side lens 431, a relay lens 433 and reflective mirrors 432 and 434, and includes the function of guiding the red light that is a color light separated by the color separating optical system 42 to a liquid crystal panel 441R.

At this time, the red light component and the green light component of the beams emitted from the integrator illuminating optical system 41 are transmitted through, and the blue light component is reflected by, the dichroic mirror 421 of the color separating optical system 42. The blue light reflected by the dichroic mirror 421 is reflected by the reflective mirror 423, passes through a field lens 418 and reaches a liquid crystal panel 441B for the blue light. The field lens 418 changes the partial beams emitted from the second lens array 413 to beams parallel to the central axis thereof (main beam). The same is true of field lenses 418 disposed at the light incident sides of other liquid crystal panels 441G and 441R.

Of the red light and green light transmitted through the dichroic mirror 421, the green light is reflected by the dichroic mirror 422, passes through the field lens 418 and reaches the liquid crystal panel 441G for the green light. The red light is transmitted through the dichroic mirror 422, passes through the relay optical system 43, further passes through the field lens 418 and reaches the liquid crystal panel 441R for the red light. The reason the relay optical system 43 is used for the red light is to prevent the lowering of the utilization ratio of light due to the scattering or the like of light because the length of the light path of the red light is longer than the length of the light paths of the other color lights. That is, it is to transmit, as is, the partial beams without change made incident at the incident side lens 431 to the field lens 418. Although the relay optical system 43 has a configuration that passes the red light of the three color lights, the relay optical system 43 is not limited thereto and may also have a configuration that passes, for example, the blue light.

The optical device 44 forms a color image by modulating, in accordance with image information, the incident beams and includes three incident side polarizing plates 442, on which the each color lights separated by the color separating optical system 42 are made incident, the liquid crystal panels 441R, 441G and 441B, which serve as light modulating devices disposed at later stages of each incident side polarizing plate 442, emission side polarizing plates 443 that are disposed at later stages of each of the liquid crystal panels 441R, 441G and 441B, and a cross dichroic prism 444 serving as a color synthesizing optical system.

The liquid crystal panels 441R, 441G and 441B are panels that use, for example, a polysilicon TFT as a switching element. Although not illustrated, the liquid crystal panels 441R, 441G and 441B are configured by accommodating panel bodies, in which liquid crystal is tightly sealed and filled in a pair of mutually opposing transparent substrates, in holding frames.

In the optical device 44, each color light separated by the color separating optical system 42 is modulated in accordance with image information by the three liquid crystal panels 441R, 441G and 441B, the incident side polarizing plates 442 and the emission side polarizing plates 443 to form the optical image.

The incident side polarizing plates 442 transmit only polarized light of one direction of the each color lights separated by the color separating optical system 42, absorb other beams thereof, and are plates where a polarizing film is adhered to a substrate such as sapphire glass. A polarizing film may also be adhered to the field lenses 418 without using a substrate.

The emission side polarizing plates 443 are configured in substantially the same manner as the incident side polarizing plates 442, transmit only polarized light of a predetermined direction of the beams emitted from the liquid crystal panels 441 (441R, 441G and 441B), and absorb other beams thereof. A polarizing film may also be adhered to the cross dichroic prism 444 without using a substrate.

The incident side polarizing plates 442 and the emission side polarizing plates 443 are set so that the directions of their mutual polarization axes intersect orthogonally.

The cross dichroic prism 444 synthesizes the optical images emitted from the emission side polarizing plates 443 and modulated per color light to form a color image.

A dielectric multilayer film that reflects red light and a dielectric multilayer film that reflects blue light are disposed on the cross dichroic mirror 444 in a substantial "X" shape along the interfaces of four rectangular prisms, and the three color lights are synthesized by these dielectric multilayer films.

In the optical device 44, a panel fixing plate, in which pins that project outward are disposed at four corner portions of a rectangular plate-like body, is adhered to each beam incident end surface of the cross dichroic prism 444, so that the optical device 44 is integrated by inserting the each pin into holes formed in the holding frames of the liquid crystal panels 441R, 441G and 441B.

The integrated optical device 44 is disposed at a light path front stage of the projection lens 3 of the light guide 40 described above and screwed and fixed to a bottom surface portion of the lower light guide 401.

(2-2) Structure of Control Board 5

As shown in FIG. 3, the control board 5 is disposed so as to cover the upper side of the optical unit 4 and includes a main board 51, on which a processor and a liquid crystal panel drive IC are mounted, and an interface board 52 that is connected at a rear end side of the main board 51 and stands at the rear surface portions 21D and 22D of the external case 2.

The connector group 25 described above is mounted on a rear side of the interface board 52, and image information inputted from the connector group 25 is outputted to the main board 51 via the interface board 52.

The processor on the main board 51 processes the inputted image information and thereafter outputs a control command to the liquid crystal panel drive IC. The drive IC outputs a drive signal on the basis of this control command to drive the liquid crystal panels 441, whereby light modulation is conducted in accordance with image information and an optical image is formed.

The main board 51 is covered by a metal plate 53 formed by bending punching metal. The metal plate 53 is disposed in order to prevent EMI (electromagnetic interference) resulting from circuit elements or the like on the main board 51.

(2-3) Structure of Power Supply Device 6

Figure 6:
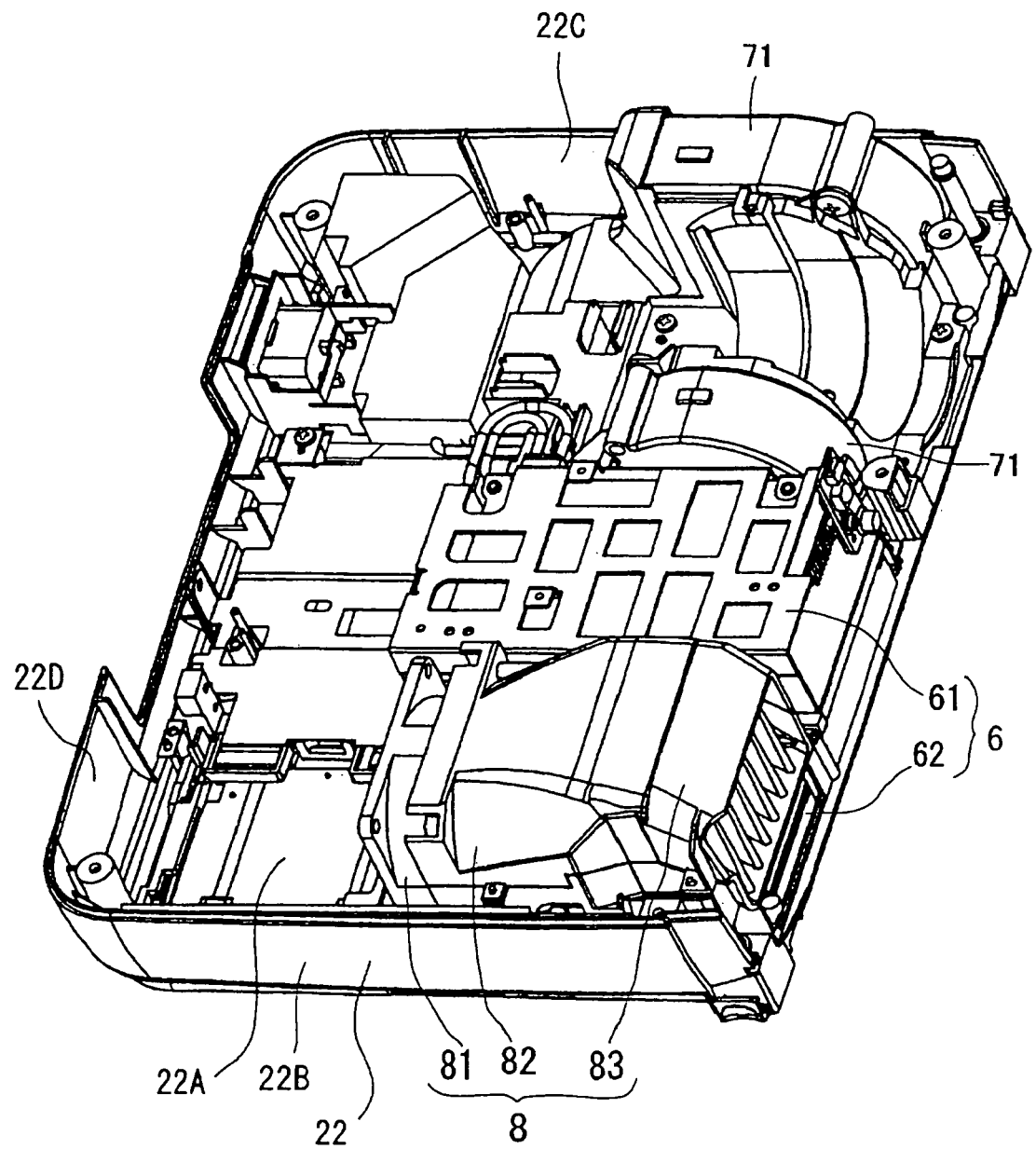
FIG. 6 is a schematic perspective view showing the disposition of a power supply circuit in the embodiment.
Figure 7:
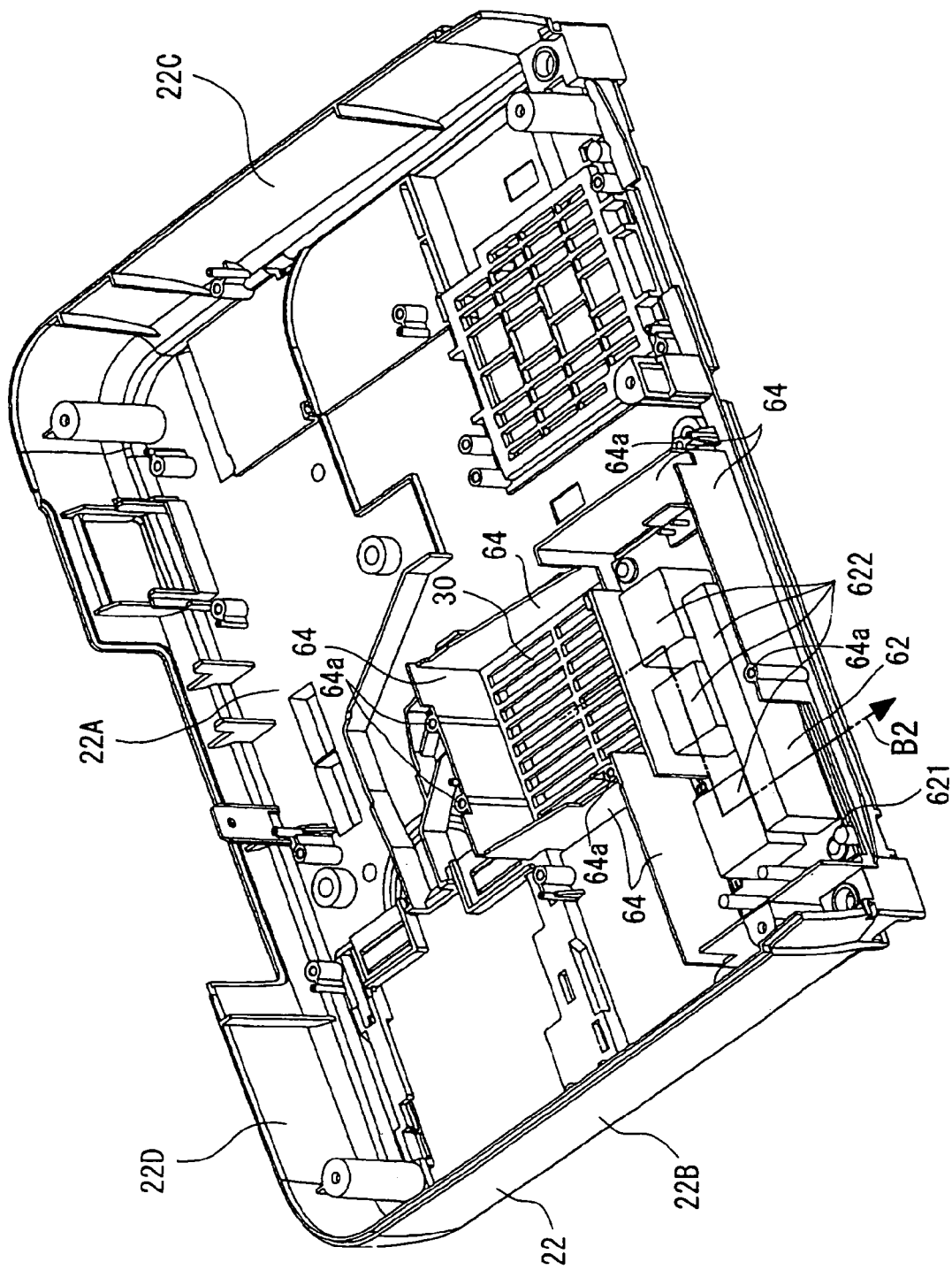
FIG. 7 is a schematic perspective view showing the disposition of a light source drive circuit in the embodiment.
Figure 12:
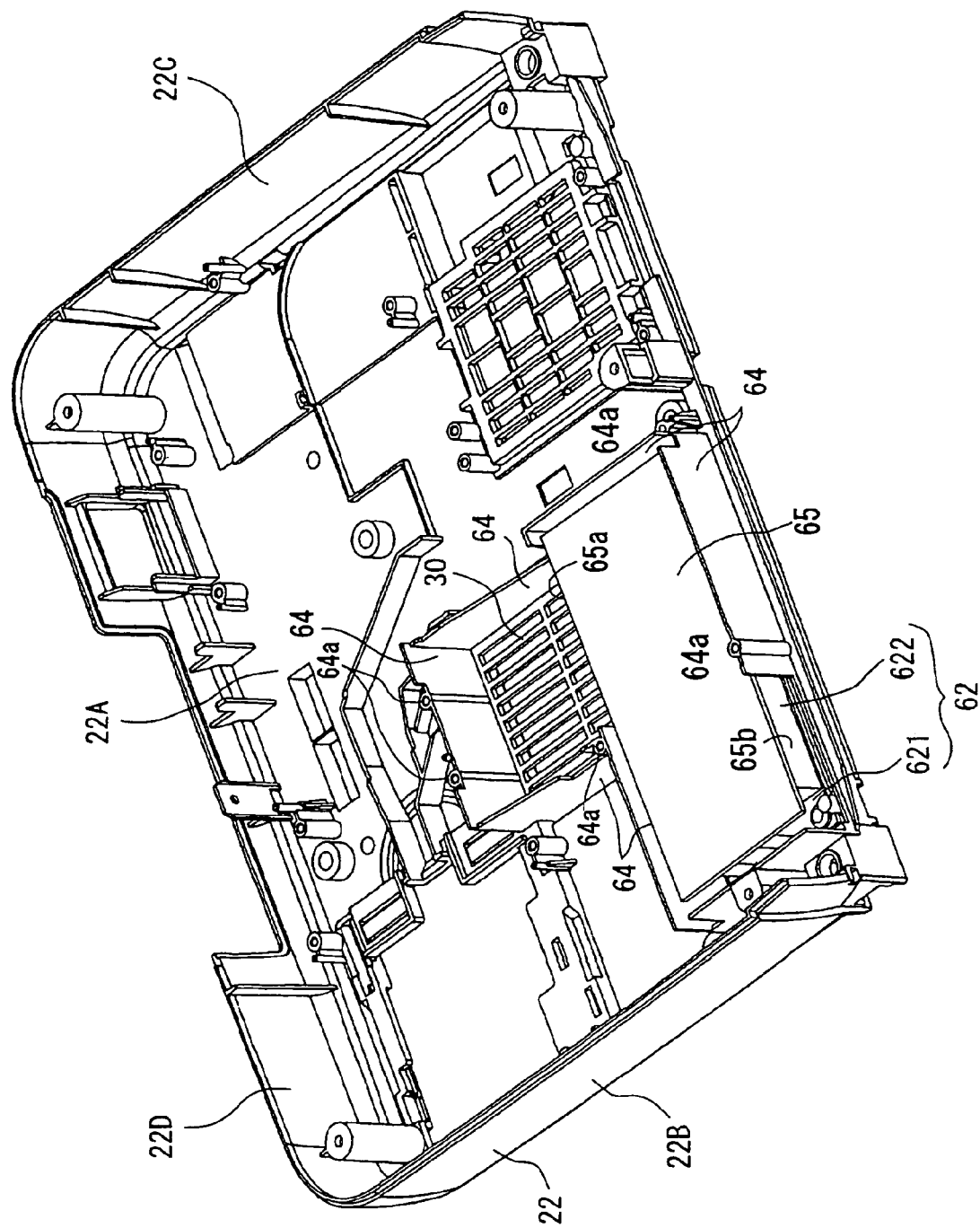
FIG. 12 is a schematic perspective view showing the disposition of the light source drive circuit in the embodiment.

The power supply device 6 has a power supply unit 61, which is shown in FIG. 6 and is disposed with a power supply circuit, and a lamp drive unit 62, which is shown in FIGS. 7 and 12, includes a light source drive circuit and is disposed below the power supply unit 61. FIG. 12 shows the lamp drive unit 62 mounted on the lower case 22. FIG. 7 is a diagram showing an instance where an air-guiding member 65 of FIG. 12 is made pervious.

The power supply unit 61 supplies, to the lamp drive unit 62, the control board 5 or the like, power supplied from the outside through an unillustrated power cable connected to the inlet connector 33 described above.

Figure 8:
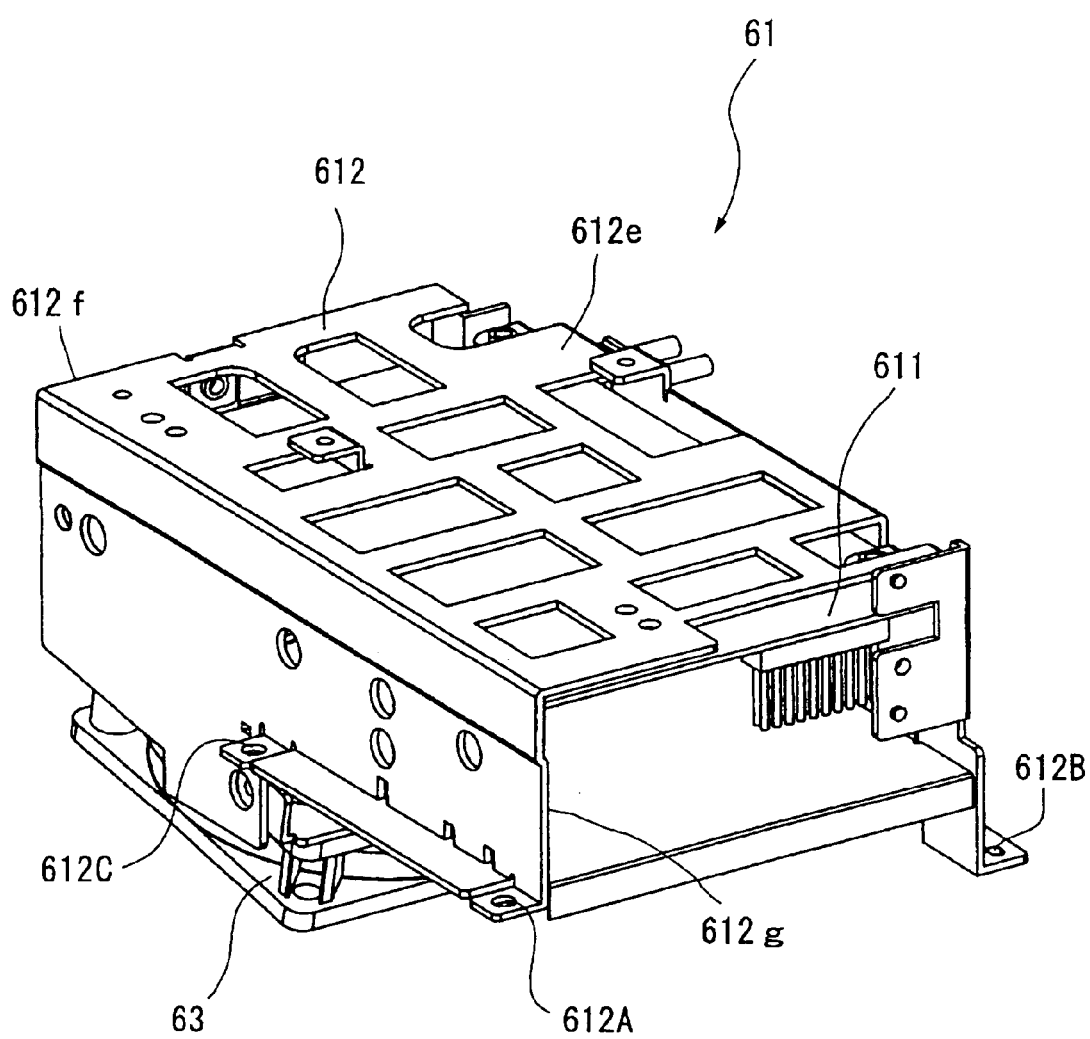
FIG. 8 is a perspective view showing the structure of the power supply circuit in the embodiment.

As shown in FIG. 8, the power supply unit 61 has a main-body board 611 and a metal cylindrical body 612 that surrounds the main-body board 611.

The cylindrical body 612 has a substantially box-like shape with a hollow center, is disposed with an opening 612h at part of one end surface 612f side of the bottom surface, and an end surface 612g of the other end is open.

Lower ends of both side surfaces of the other end surface 612g side of the cylindrical body 612 are bent horizontally outward. Holes 612A and 612B are formed in these horizontal portions. The lower ends of a side surface portion of the substantially central portion of the cylindrical body 612 is also bent outward and a hole 612C is formed therein. It is preferable for the cylindrical body 612 to be made of metal so that it functions as an air-guiding member circulating cooling air as well as can prevent EMI similar to the metal plate 53 in the control board 5.

A side surface portion of the one end surface 612f side of the cylindrical body 612 extends downward, and an intake fan 63 is attached to the opening 612h within the extending portion.

Figure 9:
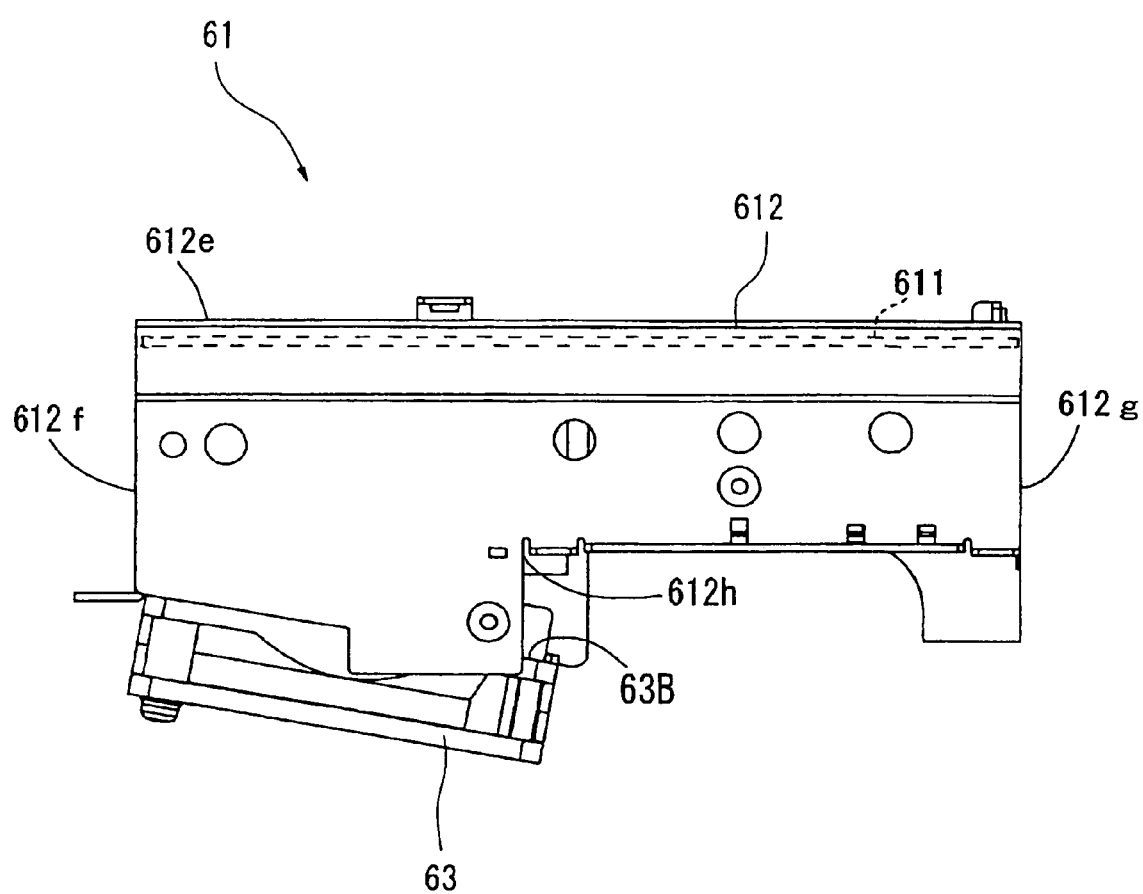
FIG. 9 is a side view showing the structure of the power supply circuit in the embodiment.

As shown in FIG. 9, the intake fan 63 is attached at an inclination so as to become closer to a top surface 612e of the cylindrical body 612 and the main-body board 611 as it approaches the end surface 612f. Part of a discharge surface 63B of the intake fan 63 is exposed inside the cylindrical body 612.

The lamp drive unit 62 is a conversion circuit for supplying power at a stable voltage to the light source device 411 described above. A commercial alternating current inputted from the power supply unit 61 is commutated and converted by the lamp drive unit 62, becomes a direct current or an alternating rectangular wave current and is supplied to the light source device 411.

Figure 10:
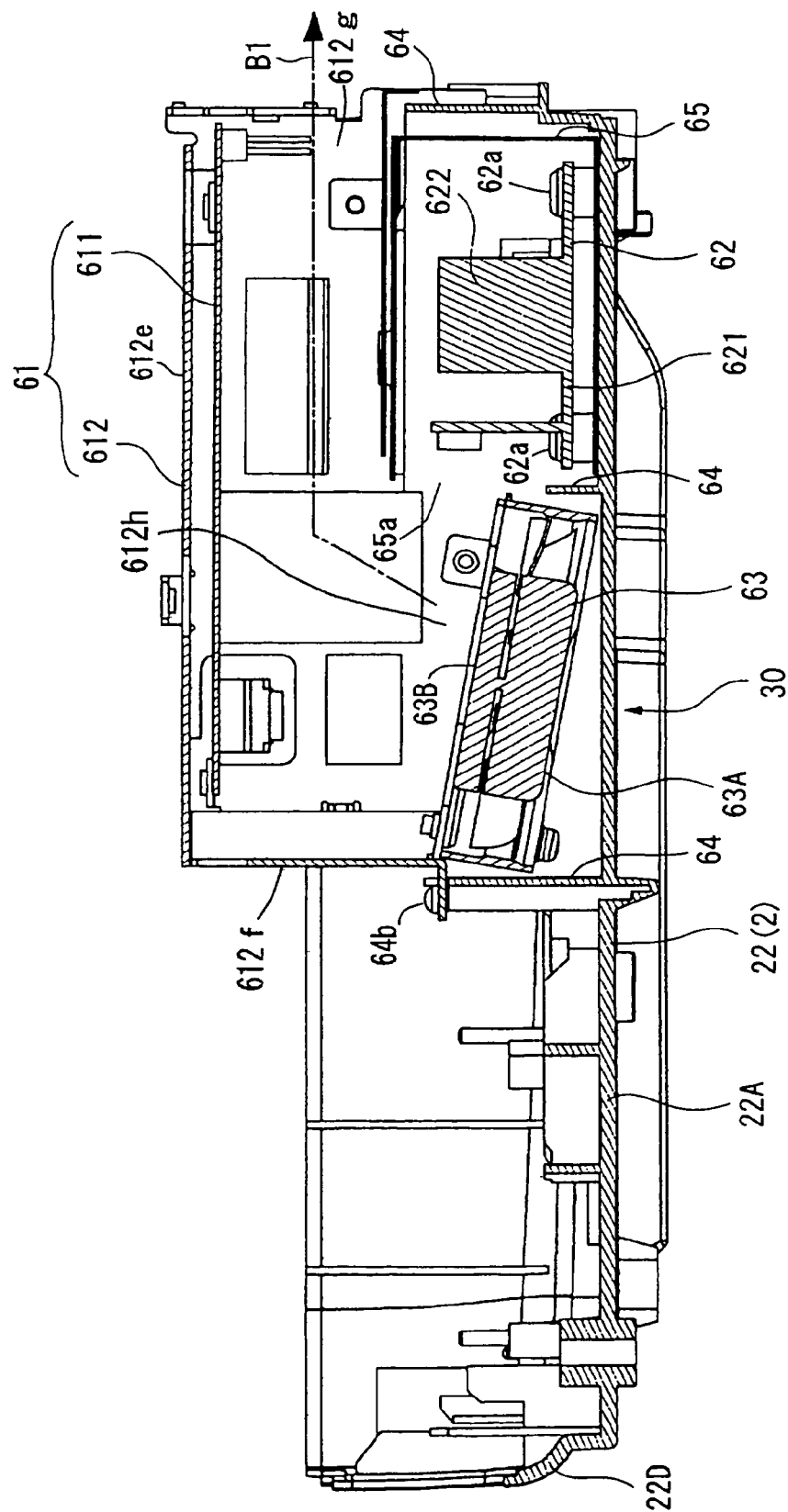
FIG. 10 is a cross-sectional view showing the disposed structure of the power supply circuit and the light source drive circuit in the embodiment.

As shown in FIGS. 7 and 10, the lamp drive unit 62 is disposed with a substrate 621, various circuit elements 622 on an upper surface portion of the substrate 621, and the air-guiding member 65 that allows cooling air to circulate to the substrate 621 and the circuit elements 622. Also, the lamp drive unit 62 is disposed so that a part thereof intersects with the power supply unit 61 described above.

As for the air-guiding member 65, an opening 65a that introduces cooling air is formed in a portion of a side surface that is adjacent to the opening 30, and an opening 65b is formed near a corner portion opposite from a corner portion near the opening 65a, in a side surface opposite from the side surface in which the opening 65a is formed.

The power supply unit 61 and the lamp drive unit 62 are fixed to the lower case 22, as shown in FIGS. 6, 10 and 12.

First, the lamp drive unit 62 is fixed by resin rivets 62a to the bottom surface portion 22A of the lower case 22 in a state where it is surrounded by the air-guiding member 65. The lamp drive unit 62 may also be configured so that it is fixed to the bottom surface portion 22A with screws instead of the rivets 62a.

Moreover, the lamp drive unit 62 is surrounded by a plurality of tabular bodies 64 standing on the bottom surface portion 22A of the lower case 22. A plurality of tabular bodies 64 is disposed so as to also surround the intake opening 30 formed in the bottom surface portion 22A. The space near the opening 30 and the space in which the lamp drive unit 62 is disposed are independent from other spaces inside the lower case 22 with a plurality of tabular bodies 64.

A plurality of tabular bodies 64 are configured so as to be simultaneously and integrally formed at the time the lower case 22 is injection-molded. Next, the power supply unit 61 is disposed on the upper portion of the lamp drive unit 62 so as to intersect with part of the lamp drive unit 62 in plan view. Screw holes 64a (see FIG. 7) formed in upper portions of the tabular bodies 64 are aligned with the holes 612A to 612C (see FIG. 8) formed in the cylindrical body 612 of the power supply unit 61, and the power supply unit 61 is fixed with screws 64b to the upper surface portions of the tabular bodies 64 (see FIG. 10).

At this time, the intake fan 63 disposed in the cylindrical body 612 is disposed slightly away from the opening 30 formed in the bottom surface portion 22A in a state where it is surrounded by a plurality of tabular bodies 64. Moreover, the intake fan 63 is disposed at an inclination with respect to the bottom surface portion 22A so that an intake surface 63A of the intake fan 63 becomes closer to the bottom surface portion 22A as it approaches the projection direction of the projector 1.

In the present embodiment, the air after cooling is discharged from the front surface side of the projector 1 in a cooling system A described later. Thus, although the intake fan 63 has this inclined disposition, it is preferable to reverse this inclination when the air is discharged from the rear surface side of the projector 1. In other words, it is preferable to dispose the intake fan 63 at an inclination so that the intake surface 63A becomes closer to the intake opening 33 as it approaches the discharge direction of the cooling air flow of the projector 1, i.e., the opening 35. By configuring the invention in this manner, the potential for the intake fan 63 to take in air inside the projector 1 that has already cooled other heat-generating sources and become warm can be lessened. Thus, the intake fan 63 can take in air whose temperature is low and can further improve cooling efficiency.

As shown in FIG. 10, the discharge surface 63B of the intake fan 63 is inclined so as to be able to blow air to both the opening 612h of the cylindrical body 612 and the opening 65a of the air-guiding member 65.

Thus, according to the above-described structure, from the opening 30 formed in the case 2, the intake surface 63A of the intake fan 63 is joined by a plurality of tabular bodies 64, the discharge surface 63B of the intake fan 63 is respectively joined by the cylindrical body 612 and a plurality of tabular bodies 64 to the one opening 612h of the cylindrical body 612 and the one opening 65a of the air-guiding member 65, the end surface 612g that is the other opening of the cylindrical body 612 is disposed at a position corresponding to a portion at the upper right of the opening 35 formed in the case 2 when seen from the front case 23 side, the other opening 65b of the air-guiding member 65 is disposed at a position corresponding to a portion at the lower left of the opening 35 formed in the case 2 when seen from the front case 23 side, and they respectively join the discharge surface 63B of the intake fan 63 and the opening 35 to make cooling systems B1 and B2 independent and form circulation paths for the circulating cooling air.

By adjusting the angle of inclination of the discharge surface 63B of the intake fan 63 and/or the shapes of the opening 612h and the opening 612g of the cylindrical body 612 and/or the shapes of the opening 65a and the opening 65b of the air-guiding member 65 in accordance with the heat-generating state of the power supply unit 61 and the lamp drive unit 62 from a calculation result or an experimental result of the heat value of the power supply unit 61 and the lamp drive unit 62, the airflow of each can be adjusted.

(2-4) Structure of Discharge Unit

As shown in FIG. 3, a discharge unit 8 is disposed along the external case 2 at a side surface portion of the light source device 411.

The discharge unit 8 has a cylindrical discharge duct 81, a discharge fan 82 attached to the light source device 411 side end portion of the discharge duct 81, and an internal louver 83 attached to the front case 23 side of the discharge duct 81. The discharge unit 8 uses the blowing of the discharge fan 82 to discharge, through the discharge duct 81 and via the internal louver 83, air that has cooled the inside of the projector 1 near the light source device 411 and the control board 5.

The discharge fan 82 sucks air that has cooled the inside of the projector 1 near the light source device 411 and the control board 5 and sends the sucked cooling air inside the discharge duct 81.

Because the discharge fan 82 is screwed to one opening of the discharge duct 81, the discharge fan 82 and that one opening of the discharge fan 81 are tightly adhered together so that cooling air does not leak from this connected portion.

The discharge duct 81 has a cylindrical shape, whose cross section is substantially rectangular, and is disposed with an opening at both ends. One of the openings at both ends is connected to a discharge surface of the discharge fan 82 and the other opening is connected to the internal louver 83. The other opening of the discharge duct 81 to which the internal louver 83 is connected is disposed so as to face the upper left portion of the opening 35 when seen from the front case 23 side.

The internal louver 83 disposed to the other opening of the discharge duct 81 is a commutative louver that has the commutative function of commutating cooling air discharged from the discharge duct 81 and circulating the cooling air only in a predetermined direction. The internal louver 83 is disposed so that a plurality of slats 831 that extend in a vertical direction are mutually substantially parallel.

The slats 831 are horizontally juxtaposed along the flow path of the cooling air and vertically partition the other opening of the discharge duct 81. The internal louver 83 is disposed at the upper left portion of the opening 35 seen from the front case 23 side and uses the each slats 831 to discharge the cooling air of a later-described cooling system A through the opening 35 in a direction away from the image projection region of the projector 1.

The discharge unit 8 is screwed and fixed to the lower case 22. That is, the discharge unit 8 is disposed on the lamp drive unit 62 and fixed to the bottom surface portion 22A of the lower case 22 so that the discharge unit 8 intersects with part of the lamp drive unit 62 in plan view.

Thus, an intake port that is one end of the discharge unit 8 faces the light source device 411 and a discharge port that is the other end of the discharge unit 8 faces the opening 35 of the front case 23.

(2-5) Cooling Structure

Figure 11:
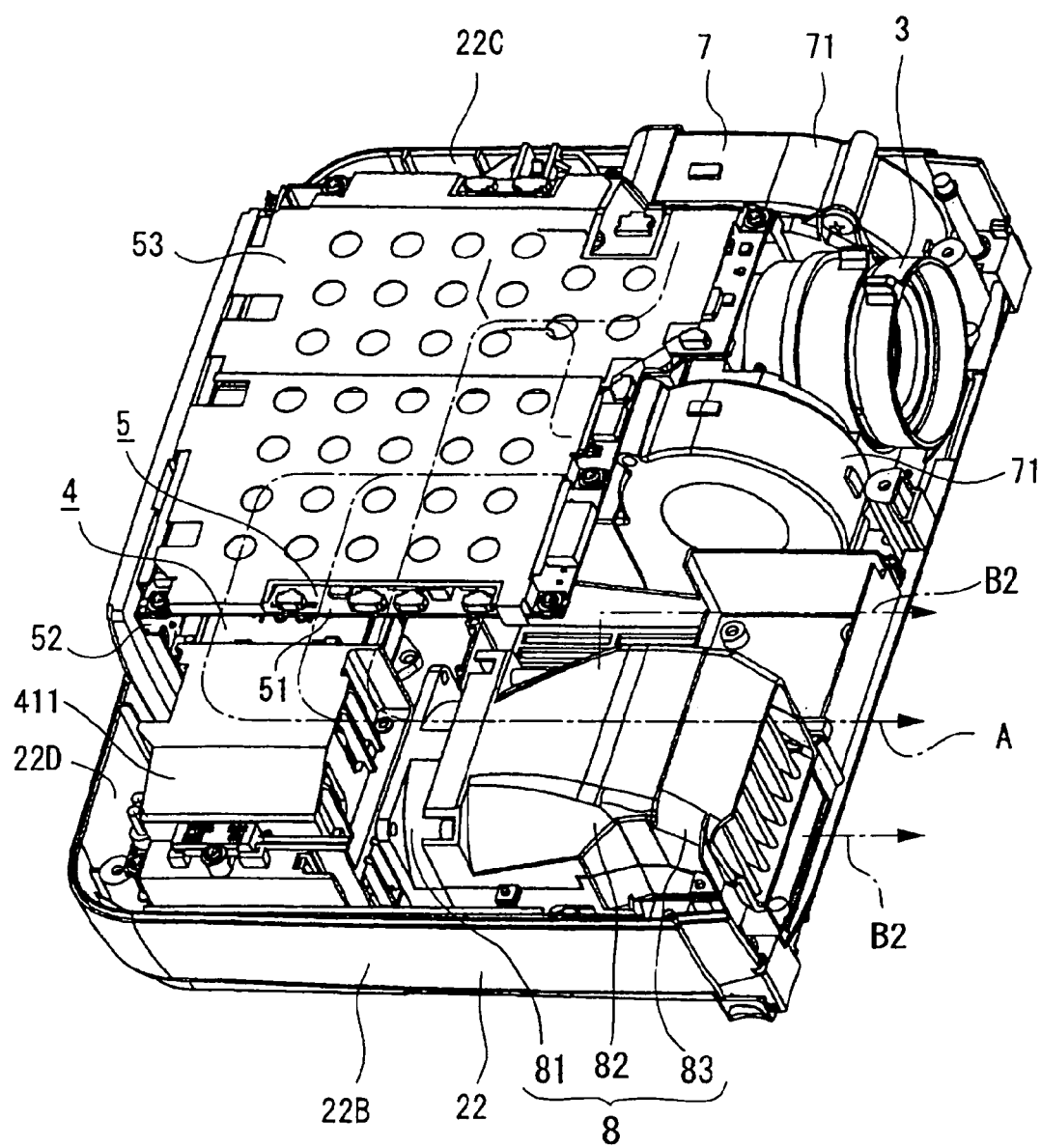
FIG. 11 is a schematic perspective view showing a cooling system of the projector in the embodiment.

As shown in FIG. 11, the cooling system A that cools the optical device 44 and the cooling system B that cools the power supply device 6 are set in the projector 1 described above.

The cooling system A is a flow of cooling air taken in through the opening 29 (see FIG. 2) by an intake unit 7.

The intake unit 7 includes a pair of mutually opposing sirocco fans 71 that sandwich the projection lens 3 therebetween and a duct (not shown) that connects intake surfaces of the pair of sirocco fans 71 and the opening 29.

Cooling air directly taken in by the intake unit 7 from the outside of the projector 1 is supplied below the liquid crystal panels 441R, 441G and 441B via the sirocco fans 71, flows upward from below along the beam incident end surface of the cross dichroic prism 444, and cools the liquid crystal panels 441R, 441G and 441B, the emission side polarizing plates 443 and the incident side polarizing plates 442.

Cooling air flowing above the optical device 44 strikes the main board 51 configuring the control board 5, so that the flowing direction thereof is bent at a right angle, and cools the various circuit elements mounted on the main board 51.

Cooling air cooling the main board 51 is collected by the discharge fan 81, sent towards the discharge duct 82 and is discharged through the opening 35 (see FIG. 1) of the front case 23 to the outside of the projector 1.

Here, the sirocco fan 71 disposed at the left side of the projection lens 3 when seen from the front side of the projector 1 of FIG. 11 supplies cooling air to the liquid crystal panels 441R and 441B, but part of that cooling air is used as cooling air for the polarization converting element 414 and the light source device 411.

That is, some of the cooling air flows through a gap formed between the bottom surface portion 22A of the lower case 22 and the lower surface of the lower light guide 401, and the air is further divided into two directions on the path. Cooling air divided in one direction is supplied to the interior of the light guide 40 through a slit hole formed in the lower surface of the lower light guide 401 of a position corresponding to the polarization converting element 414, cools the polarization converting element 414, and is thereafter supplied to the light source device 411 to cool the light source lamp 416. Cooling air divided in the other direction is directly supplied to the light source device 411 to cool the light source lamp 416.

Then, the air cooling the light source device 411 is collected by the discharge fan 81, sent towards the discharge duct 82 and is discharged through the opening 35 (see FIG. 1) of the front case 23 to the outside of the projector 1.

The cooling system B is a flow of cooling air taken in through the opening 30 (see FIG. 2) by the intake fan 63 disposed in the power supply unit 61 and includes a cooling system B1 that cools the power supply unit 61 and a cooling system B2 that cools the lamp drive unit 62.

To describe these in more detail with reference to FIG. 10, the cooling system B 1 is an airflow that one part of the cooling air directly taken in by the intake fan 63 from the outside of the projector 1 through the opening 30 is supplied to the interior of the cylindrical body 612 of the power supply unit 61, cools the circuit elements mounted on the main-body board 611, and is thereafter directly discharged to the outside through the opening 35 (see FIG. 1) formed in the front case 23.

As for the cooling system B2, another part of the cooling air directly taken in by the intake fan 63 from the outside of the projector 1 through the opening 30 flows along the tabular bodies 64 to below the cylindrical body 612, is supplied to the interior of the air-guiding member 65 disposed in the lamp drive unit 62, cools the circuit elements mounted on the substrate 621 of the lamp drive unit 62, and is thereafter discharged to the outside through the portion of the opening 35 below the discharge duct 82.

As described above, the cooling system A and the cooling system B use their separate intake fans 71 and 63 to directly take in outside air, individually cool heat-generating sources, thereafter discharge the air from the discharge duct 82 of the cooling system A through the upper left portion of the opening 35, discharge the air from the enclosed member 65 of the cooling system B2 through the lower left portion of the opening 35, and discharge the air from cylindrical body 612 of the cooling system B1 through the lower right portion of the opening 35, seen from the front case 23 side of the projector 1. Thus, although the air of both the cooling system A and the cooling system B after cooling is discharged through the opening 35, it is discharged through respectively different regions of the opening 35.

(3) Effects of the Embodiment

According to the present embodiment described above, there are following effects.

(3-1) The invention has a configuration where outside air is directly introduced, as cooling air, by the intake fan 63 through the intake opening 30 formed in the bottom surface portion 22A of the external case 2 disposed with the fixed leg portion 26 and the adjustable leg portions 27. Thus, the cooling air taken in by the intake fan 63 in the cooling system B does not interfere with the flow of other cooling air taken in by other fans inside the external case 2 such as, for example, the discharge fan 81 along the front case 23 and the sirocco fans 71 along the side surface portions 21B, 22B, 21C and 22C. Thus, it becomes possible for the respective fans to take in cooling air from different spaces and blow a sufficient amount of the cooling air to cooling targets. Additionally, turbulence resulting from the interference of the air flows of the respective fans can be prevented and the prevention of noise can also be achieved. Moreover, by disposing the intake opening 30 in the bottom surface portion 22A of the external case 2 disposed with the fixed leg portion 26 and the adjustable leg portions 27 and disposing the intake fan 63 near the intake opening 30, it is easy to miniaturize the projector 1 in plan view.

(3-2) The intake surface 63A of the intake fan 63 is disposed at an inclination with respect to the surface of the bottom surface portion 22A in which the intake opening 30 is formed. Thus, when the projector 1 is set on a mounting table or the like, the intake surface 63A of the intake fan 63 is disposed at a predetermined distance away from the surface of the mounting table even if the opening 30 and the surface of the mounting table are close, and it becomes possible to secure a space near the intake surface 63A of the intake fan 63. Thus, the intake fan 63 can reliably introduce sufficient cooling air to the interior of the external case 2, can prevent turbulence in the vicinity of the intake fan 63 and can prevent noise. That is, even in a state where the intake surface of the intake fan is close to the surface of the mounting table, instances where the case blocks the flow of air accompanying the rotation of the intake fan so that the intake amount is lessened and frictional noise is generated can be prevented.

(3-3) By disposing the intake fan 63 at an inclination with respect to the bottom surface portion 22A of the external case 2, the intake fan 63 is disposed away from the intake opening 30, whereby it becomes difficult for noise accompanying the rotation of the intake fan 63 to leak to the outside and the quietness of the projector 1 is improved.

(3-4) Due to the cooling system B, cooling air can be directly introduced from the outside of the external case 2 to cool the power supply unit 61 and the lamp drive unit 62, which are heat-generating sources. Thus, these can be efficiently cooled.

(3-5) Because the cooling system B that cools the power supply unit 61 and the lamp drive unit 62 is made independent from the other cooling system A, these can be even more efficiently cooled and the cooling efficiency of the other cooling system A can be improved without heat generated by these exerting an influence on other cooling systems.

(3-6) Because the intake surface 63A of the intake fan 63 is disposed at an inclination with respect to the surface of the bottom surface portion 22A in which the intake opening 30 is disposed, air sucked up in the vertical direction can be circulated in the horizontal direction. That is, with the cooling system B that circulates, along the bottom surface portion 22A of the external case 2, the cooled air sucked up from below the external case 2 by the intake fan 63 and discharged obliquely upward, a cooling flow path is formed in parallel with the other cooling system A, whereby the cooling system B of the power supply unit 61 and the lamp drive unit 62 can be reliably made independent from the other cooling system A. Moreover, it becomes possible for the cooling system B circulating air along the bottom surface portion 22A of the external case 2 to cool a wider planar range.

(3-7) By partitioning the cooling system B from other spaces with the tabular bodies 64, the cooling system B can be made completely independent from the other cooling system A so that it can more efficiently cool the power supply unit 61 and the lamp drive unit 62.

(3-8) By adjusting the angle of inclination of the discharge surface 63B of the intake fan 63, the shape of the cylindrical body 612 and the shape of the air-guiding member 65 in accordance with the heat-generating state of the power supply unit 61 and the lamp drive unit 62, the cooling air can be proportionally divided and introduced to the cylindrical body 612 and the air-guiding member 65. Thus, the cooling efficiency of these can be further improved. Also, by configuring the cylindrical body 612 and the air-guiding member 65 with metal, a function as an electromagnetic shield can be imparted. Thus, it is not necessary to separately provide an EMI countermeasure with respect to the main board-body 611 of the power supply unit 61 and the lamp drive unit 62, and the internal structure of the projector 1 can be simplified.

(3-9) Because the intake fan 63 is attached to the cylindrical body 612 of the power supply unit 61, it is not necessary to separately dispose a support member for the intake fan 63 on the bottom surface portion 22A when the intake fan 63 is disposed at an inclination with respect to the bottom surface portion 22A of the external case 2, and the internal structure of the projector 1 can be further simplified and made compact.

(3-10) Because the intake surface 63A of the intake fan 63 is disposed at an inclination with respect to the surface of the bottom surface portion 22A in which the intake opening 30 is formed, air sucked up from the vertical direction can be circulated in the horizontal direction, whereby the discharge direction can be appropriately selected. Thus, the degree of freedom of selection of a flow path of the cooling air flow corresponding to the internal structure of the projector 1 can be increased.

(3-11) Although the cooling system A that cools the optical unit 4 and the control board 5 and the cooling system B that cools the power supply device 6 are respectively independent cooling flow paths, they discharge air through the single discharge opening 35. Thus, the molding of the case can be simplified and it is easy to manage the discharge direction of the air.

(3-12) The internal louver 83 that is the discharge part of the cooling system A, the opening 612g that is the discharge part of the cooling system B1 and the opening 65b that is the discharge part of the cooling system B2 are disposed, so as to face the opening 35 formed in the front case 23, in regions of the opening 35. Thus, discharge of the flow of cooling air of the cooling system A and the cooling systems B1 and B2 can be conducted through different regions in the discharge opening 35. Thus, the flow of cooling air of the cooling system A and the cooling systems B1 and B2 can be discharged without mutual interference even at the time of discharge, so that the cooling air inside the projector 1 can flow smoothly and cooling of the interior of the projector 1 can be conducted efficiently.

(3-13) Because the intake surface 63A of the intake fan 63 is disposed at an inclination so as to become closer to the intake opening 30 as it approaches the discharge opening 35, the intake surface 63A of the intake fan 63 is disposed in a position facing the direction counter to the discharge opening 35, so that the intake fan 63 can be prevented from again taking in air that is discharged through the discharge opening 35 and that has already cooled other heat sources inside the projector 1 and become warm. Thus, the intake fan 63 can take in a larger amount of low-temperature air from outside the projector 1.

(4) Modifications of the Embodiment

The present invention is not limited to the preceding embodiment and includes modifications such as follows.

Although the intake fan 63 of the cooling system B of the power supply unit 61 and the lamp drive unit 62 was disposed at an inclination with respect to the bottom surface portion 22A of the external case 2 in the preceding embodiment, the invention is not limited thereto. That is, the invention may also be used in an instance where the intake fan is disposed directly below the optical device 44.

Also, although the cooling system B was made independent from the cooling system A by the tabular bodies 64 in the preceding embodiment, the invention is not limited thereto. That is, a duct-like member may be connected to the opening 30 to make the cooling system independent.

Moreover, in the preceding embodiment, although the invention was applied to the optical unit 4 that is substantially "L" shaped when seen in plan view, the invention is not limited thereto and may also be applied to an optical unit 4 that is substantially "U" shaped when seen in plan view. In this case, because a configuration where the power supply unit or the like is disposed in the central portion of the "U" shape is used, the present invention, which can improve the cooling efficiency of these, is even more effective.

Additionally, although the two lens arrays 120 and 130 that divide the light of the light source 110 into a plurality of partial beams were used in the preceding embodiment, the invention is also applicable to a projector that does not use such lens arrays.

Moreover, although the modulation of the beams emitted from the light source was conducted by the liquid crystal panels 441R, 441G and 441B in the preceding embodiment, the invention is not limited thereto and may also be used in a light modulating device using micro mirrors. Although description was given in the preceding embodiment of an example of a projector using three light modulating devices, the invention can also be applied to a projector using one, two, or four or more light modulating devices.

Moreover, although description was given in the preceding embodiment of an example of an instance where the invention was used in a transmissive type projector, the invention can also be used in a reflective type projector. Here, "transmissive type" refers to a type where light valves such as the liquid crystal panels or the like transmit light, and "reflective type" refers to a type where the light valves reflect light. In the instance of the reflective type projector, the light valves can be configured by only the liquid crystal panels, and pairs of polarizing plates are unnecessary. Also, in the reflective type projector, the cross dichroic prism is used as color light separating system that separates illumination light into light of the three colors of red, green and blue, and there are instances where it is also used as color light synthesizing system that re-synthesizes the modulated lights of the three colors and emits the lights in the same direction. There are also instances where a dichroic prism in which a plurality of triangular or quadratic dichroic prisms are combined is used rather than a cross dichroic prism. Even in an instance where the invention is applied to a reflective type projector, effects that are substantially the same as those of the transmissive type projector can be obtained. The light valves are not limited to liquid crystal panels and that the light valves may also be light valves using, for example, micro mirrors.

Although there are front projectors that conduct image projection from the direction in which the projection surface is seen and rear projectors that conduct image projection from the side opposite to the direction in which the projection surface is seen, the configuration of the preceding embodiment is applicable to either.

In addition, with respect to the specific structures, shapes or the like at the time the invention is implemented, other structures or the like are also acceptable within a range where the object of the invention can be achieved.

What is claimed is:

1. A projector having a light source, a light modulating device that modulates light beams emitted from the light source in accordance with image information to form an optical image, and a case that accommodates the light source and the light modulating device, and the projector enlarges and projects the optical image formed by the light modulating device, the projector comprising:
   an intake opening that is formed in a surface of the case disposed with leg portions; and
   an intake fan that is disposed inside the case near the intake opening and that introduces cooling air from outside of the case,
   an intake surface of the intake fan being disposed at an inclination with respect to a plane of the case in which the intake opening is formed.

2. The projector according to claim 1, further including:
   a power supply circuit that supplies power to the light source and the light modulating device; and
   a light source drive circuit that drives the light source;
   the intake fan being used in a cooling flow path that cools a power supply circuit and the light source drive circuit.

3. The projector according to claim 2, a cooling flow path of cooling air introduced by the intake fan being set independent from another cooling flow path.

4. The projector according to claim 3, the cooling flow path being configured to allow the cooling air to circulate along the surface of the case in which the intake opening is formed.

5. The projector according to claim 3, the cooling flow path being partitioned by tabular bodies disposed vertically from an inner surface of the case.

6. The projector according to claim 2, the power supply circuit and the light source drive circuit being surrounded by cylindrical air-guiding bodies and the cooling air from the intake fan being supplied to an inside of each air-guiding body.

7. The projector according to claim 6, the intake fan being attached to the air-guiding bodies.

8. The projector according to claim 1,
   the intake opening being a first intake opening,
   the intake fan being a first intake fan,
   a discharge opening through which air inside the case is discharged to a outside of the case being disposed in a side of the case, and
   the projector further including:
   a second intake opening that is disposed in the case separately from the first intake opening;
   a second intake fan that is disposed near the second intake opening and introduces cooling air from the outside of the case;
   a first cooling system that uses the second intake fan to introduce, through the second intake opening to an inside of the case, air from an outside of the case, circulates the air to the discharge opening so that the air is discharged through the discharge opening to the outside of the case, to thereby cool the light modulating device and the light source; and
   a second cooling system that uses the first intake fan to introduce, through the first intake opening to the inside of the case, air from the outside of the case, circulates the air to the discharge opening so that the air is discharged through the discharge opening to the outside of the case, to thereby cool the power supply circuit and the light source drive circuit.

9. The projector according to claim 8, the first cooling air flow and the second cooling air flow being discharged through different regions in the discharge opening.

10. The projector according to claim 8,
    the power supply circuit being disposed inside a cylindrical first air-guiding body,
    the light source drive circuit being disposed inside a cylindrical second air-guiding body,
    part of the second cooling air flow being introduced to the inside of the first air-guiding body and another part of the second cooling air flow being introduced to the inside of the second air-guiding body; and
    the air flow circulating through the first air-guiding body and the air flow circulating through the second air-guiding body being discharged through different regions in the discharge opening.

11. The projector according to claim 8, an intake surface of the first intake fan being disposed at an inclination so as to be distanced from the first intake opening as it approaches the discharge opening.

* * * * *